United States Patent
Ryon et al.

(10) Patent No.: US 12,117,174 B2
(45) Date of Patent: Oct. 15, 2024

(54) COMBUSTOR SECTION SUPPORT STRUCTURES

(71) Applicant: Collins Engine Nozzles, Inc., Des Moines, IA (US)

(72) Inventors: Jason A. Ryon, Carlisle, IA (US); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/109,804

(22) Filed: Feb. 14, 2023

(65) Prior Publication Data
US 2024/0271788 A1     Aug. 15, 2024

(51) Int. Cl.
*F23R 3/28*     (2006.01)
*F23R 3/60*     (2006.01)

(52) U.S. Cl.
CPC ............... *F23R 3/28* (2013.01); *F23R 3/60* (2013.01); *F23R 2900/00005* (2013.01); *F23R 2900/00012* (2013.01); *F23R 2900/00017* (2013.01)

(58) Field of Classification Search
CPC .... F02G 3/00; F23R 3/28; F23R 3/283; F23R 3/60; F23R 2900/00005; F23R 2900/00012; F23R 2900/00017
See application file for complete search history.

(56) References Cited

U.S. PATENT DOCUMENTS

| | | | | |
|---|---|---|---|---|
| 3,516,252 A | * | 6/1970 | Beane | F23R 3/283 60/739 |
| 4,441,323 A | * | 4/1984 | Colley | F23R 3/283 60/737 |
| 4,453,384 A | * | 6/1984 | Pask | F23D 11/12 60/737 |
| 5,231,833 A | | 8/1993 | MacLean et al. | |
| 5,279,112 A | | 1/1994 | Halila | |
| 5,771,696 A | | 6/1998 | Hansel et al. | |

(Continued)

OTHER PUBLICATIONS

Extended European Search Report for EP Application No. 24157651.1, dated Jul. 9, 2024, 11 pages.

*Primary Examiner* — Arun Goyal
*Assistant Examiner* — Henry Ng
(74) *Attorney, Agent, or Firm* — Kinney & Lange, P.A.

(57) ABSTRACT

A combustor section support structure can include a fuel manifold and one or more radial stud assemblies connected to the fuel manifold and configured to allow the fuel manifold to move radially relative to an engine case and to fix the fuel manifold axially relative to the engine case. Each of the one or more radial stud assemblies can include a first portion mounted to the fuel manifold and a second portion configured to mount to an engine case. The first portion and the second portion can be configured to slide relative to each other to allow relative radial movement, but to prevent axial relative movement. A system can include a fuel manifold configured to distribute fuel to one or more fuel nozzles of a turbomachine, and a fuel inlet assembly configured to connect to the fuel manifold through an engine case. The fuel inlet assembly can be configured to axially retain the fuel manifold relative to the engine case and to allow radial movement of the fuel manifold relative to the engine case.

13 Claims, 10 Drawing Sheets

(56) References Cited

U.S. PATENT DOCUMENTS

| | | | |
|---|---|---|---|
| 6,354,085 B1* | 3/2002 | Howell | F23R 3/283 60/740 |
| 7,669,424 B2 | 3/2010 | Thornton | |
| 7,856,825 B2 | 12/2010 | Fish et al. | |
| 8,393,154 B2* | 3/2013 | Gandza | F02C 3/145 60/800 |
| 9,267,689 B2* | 2/2016 | Wiebe | F02C 7/222 |
| 10,605,171 B2 | 3/2020 | Ryon et al. | |
| 2007/0084217 A1* | 4/2007 | Nicholls | F23R 3/283 60/752 |
| 2007/0137218 A1* | 6/2007 | Prociw | F23R 3/283 60/740 |
| 2007/0151259 A1* | 7/2007 | Thornton | F02C 7/222 60/797 |
| 2008/0098737 A1* | 5/2008 | Haggerty | F02C 7/22 60/740 |
| 2010/0058765 A1* | 3/2010 | Duval | F23R 3/283 60/740 |
| 2010/0281881 A1 | 11/2010 | Morenko | |
| 2011/0088409 A1* | 4/2011 | Carlisle | F23R 3/283 29/700 |
| 2013/0305726 A1* | 11/2013 | Carrere | F23R 3/14 60/746 |
| 2013/0341430 A1* | 12/2013 | Hall | F02M 61/167 239/533.2 |
| 2014/0026578 A1 | 1/2014 | Kato et al. | |
| 2015/0198096 A1 | 7/2015 | Morenko | |
| 2015/0361897 A1* | 12/2015 | Steele | F23R 3/283 60/739 |
| 2016/0245513 A1* | 8/2016 | Buchheim | F16L 19/025 |
| 2021/0310413 A1* | 10/2021 | Nakamura | F23D 11/107 |
| 2022/0196241 A1* | 6/2022 | Swaby | F02C 7/22 |

* cited by examiner

COMBUSTOR SECTION SUPPORT STRUCTURES

FIELD

This disclosure relates to combustor section support structures, e.g., for turbomachines.

BACKGROUND

In gas turbine engines, the combustor section is supported by the engine case. The fuel injectors are also typically mounted to the engine case. The combustor and case are at different temperatures at different conditions. Two directions of thermal expansion typically can exist. Axial thermal expansion of different components (such as engine case and combustor liner) can occur because of different material properties and different temperatures. Also, radial thermal expansion can occur within circular components which are heated (such as engine case). If a circular component remains cold (such as an internal fuel manifold), it may not grow radially.

These thermal mismatches can cause high stresses in components which are connected rigidly. To accommodate, traditional systems include burner seals around fuel injectors and labyrinth or fish-mouth seals at other locations. Such systems may not properly meter air into the combustor (e.g., which can cause hot spots in combustor). Such systems can also include many components which adds cost and weight. Additionally, the load is carried through hot components (e.g., a dome plate and combustor liner) which don't typically have high strength at high temperatures.

Such conventional methods and systems have generally been considered satisfactory for their intended purpose. However, there is still a need in the art for improvements. The present disclosure provides a solution for this need.

SUMMARY

In accordance with at least one aspect of this disclosure, a combustor section support structure can include a fuel manifold and one or more radial stud assemblies connected to the fuel manifold and configured to allow the fuel manifold to move radially relative to an engine case and to fix the fuel manifold axially relative to the engine case. Each of the one or more radial stud assemblies can include a first portion mounted to the fuel manifold and a second portion configured to mount to an engine case. The first portion and the second portion can be configured to slide relative to each other to allow relative radial movement, but to prevent axial relative movement.

The first portion can extend from the fuel manifold to a radial distance that is less than an inner diameter of the engine case. In certain embodiments, the structure can include the engine case.

The one or more radial stud assemblies can be radially aligned with a fuel inlet tube associated with the engine case. In certain embodiments, the structure can include a plurality of fuel nozzles connected to and supported by the fuel manifold, a dome plate connected to the plurality of the fuel nozzles, a combustor liner connected to the dome plate, and a sliding seal configured to extend from the engine case and radially supporting a downstream portion of the combustor liner.

In certain embodiments, the first portion can be a stud. The second portion can be a nut having a stud channel configured to slidably receive the stud, and outer nut threads configured to thread to a nut socket.

The one or more radial stud assemblies can further include a nut socket having inner socket threads configured to mesh with the outer nut threads. In certain embodiments, the nut socket can be attached to the engine case. In certain embodiments, the nut socket can be formed in the engine case.

In certain embodiments, the first portion can be a nut attached to the fuel manifold. The second portion can be a stud configured to be installed through the engine case. The nut can include a stud channel configured to slidably receive the stud, for example.

In accordance with at least one embodiment of this disclosure, a turbomachine can include a combustor section support structure. The structure can be any suitable embodiment of a structure disclosed herein, for example, e.g., as described above.

In accordance with at least one aspect of this disclosure, a method can include inserting a fuel manifold axially into an engine case to a mount location such that a radial stud assembly attached to the fuel manifold is aligned with a fuel inlet, moving a nut of the radial stud assembly radially outward relative to a stud of the radial stud assembly and the fuel manifold, and attaching the nut to the engine case such that the nut is configured to allow the stud to move radially relative to the engine case and to constrain the stud axially relative to the engine case. In certain embodiments, attaching the nut can include threading the nut into a socket associated with the engine case while the stud is within a stud channel of the nut.

In accordance with at least one aspect of this disclosure, a system can include a fuel manifold configured to distribute fuel to one or more fuel nozzles of a turbomachine, and a fuel inlet assembly configured to connect to the fuel manifold through an engine case. The fuel inlet assembly can be configured to axially retain the fuel manifold relative to the engine case and to allow radial movement of the fuel manifold relative to the engine case.

In certain embodiments, the fuel inlet assembly can include a fuel inlet socket fixed to the fuel manifold, the fuel inlet socket defining one or more socket fuel channels in fluid communication with one or more flow paths of the fuel manifold, and an inner mount configured to abut an inner diameter of the engine case, the inner mount defining an inner mount channel configured to receive the fuel inlet socket such that the fuel inlet socket is configured to slide radially relative to the inner mount but is retained axially by the inner mount. The fuel inlet assembly can include an outer mount configured to mount to the inner mount through the engine case to fix the inner mount and the outer mount to the engine case.

The fuel inlet assembly can include a fuel inlet tube defining one or more inlet fuel channels configured to be in fluid communication the one or more socket fuel channels of the fuel inlet socket. The inner mount and the outer mount are configured to radially retain the fuel inlet tube therebetween.

The fuel inlet assembly can include one or more transfer tubes between the one or more inlet fuel channels and the one or more socket fuel channels. The one or more transfer tubes can be configured to move relative to the fuel inlet tube and maintain engagement with the fuel inlet socket to follow radial motion of the fuel inlet socket. The one or more transfer tubes can be biased toward the fuel inlet socket with one or more biasing members. In certain embodiments, each of the one or more transfer tubes can be partially disposed within and sealed to a respective inlet fuel channel and a socket fuel channel. In certain embodiments, each of the one or more biasing members can be disposed within a respective inlet fuel channel.

The inner mount can include an engine case seal channel that is configured to receive a first seal to seal to the inner diameter of the engine case. The inner mount can include a fuel inlet tube seal channel configured to receive a second seal to seal to the fuel inlet tube.

In certain embodiments, the outer mount includes an outer flange portion and a post portion. The post portion can be configured to insert into an opening in the engine case, and the outer flange portion can be configured to limit insertion of the post portion. The post portion can be the same length as the engine case is thick to abut the inner mount. The outer mount can include an inner flange portion that is configured to radially trap the fuel inlet tube by engaging with a fuel inlet tube flange. The outer mount can include a plurality of fastener holes each configured to allow a fastener to extend through the outer mount to interface with the inner mount.

The inner mount can include a plurality of engagement holes configured to receive the fastener extending through the outer mount. Each fastener can be a threaded bolt, and the engagement holes can be threaded to mesh with each threaded bolt.

In certain embodiments, the inner mount can be shaped to be conformal to the inner diameter of the engine case. The outer mount can be shaped to be conformal to an outer surface of the engine case.

In accordance with at least one aspect of this disclosure, a turbomachine can include an engine case (e.g., as disclosed above), a fuel manifold (e.g., as disclosed above), a fuel inlet socket (e.g., as disclosed above) fixed to the fuel manifold, an inner mount (e.g., as disclosed above) abutting an inner diameter of an engine case, an outer mount (e.g., as disclosed above) mounted to the inner mount through the engine case to fix the inner mount and the outer mount to the engine case, and a fuel inlet tube (e.g., as disclosed above). The inner mount and the outer mount can radially retain the fuel inlet tube therebetween.

In accordance with at least one aspect of this disclosure, a method can include axially loading a fuel manifold into an engine case of a turbomachine with an inner mount and a fuel inlet socket disposed within an inner mount channel of the inner mount, and inserting an outer mount and a fuel inlet tube having one or more biased transfer tubes into an opening of the engine case to abut the inner mount to the outer mount and to fluidly connect the one or more biased transfer tubes to the fuel inlet socket. The method can include attaching the outer mount to the inner mount to fix the outer mount and the inner mount to the engine case to axially fix the fuel manifold, the inner mount, the outer mount, the fuel inlet tube, and the fuel inlet socket such that the fuel inlet socket is configured to radially move relative to the inner mount and the biased transfer tubes are configured to push against the fuel inlet socket to maintain a sealed fluid communication with the fuel inlet socket.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
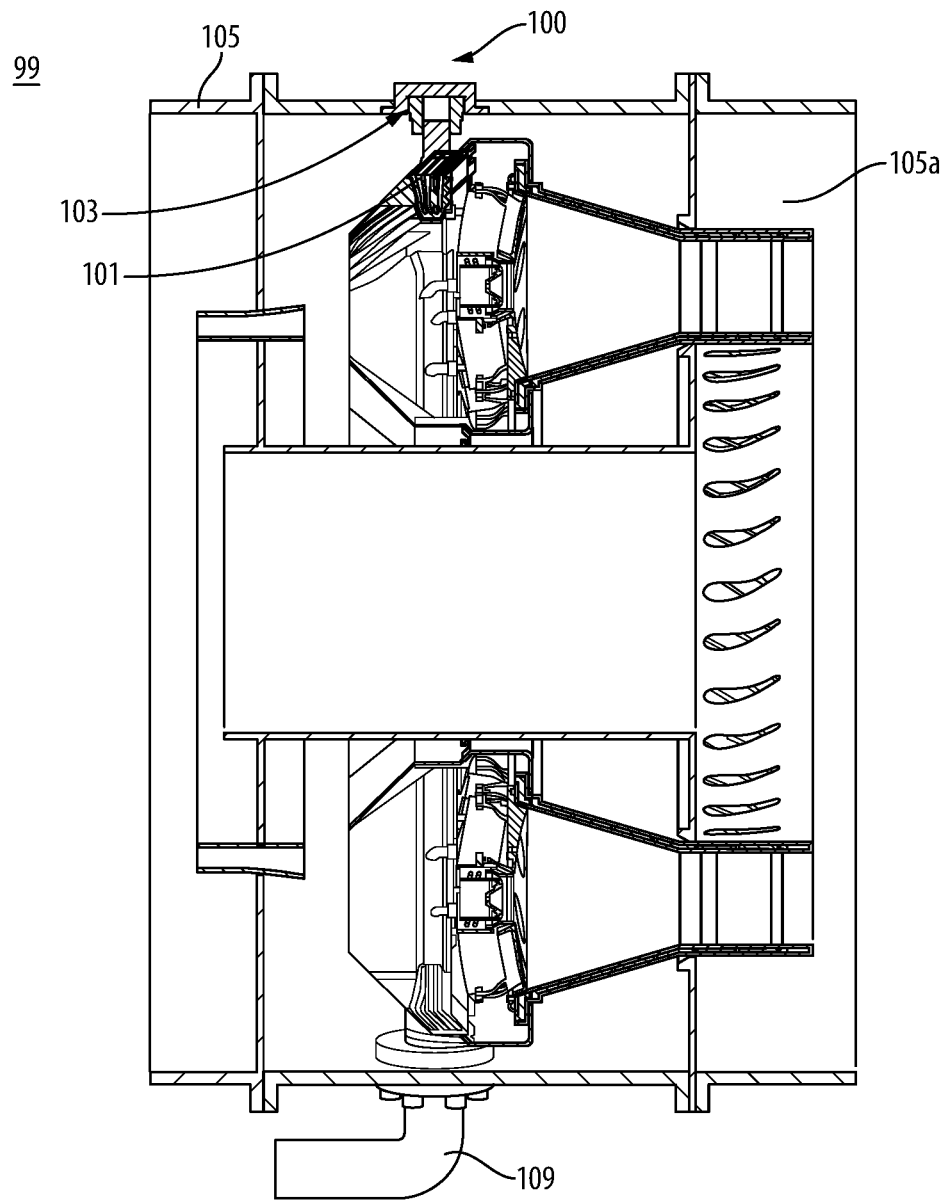
FIG. 1 is a cross-sectional view of an embodiment of a turbomachine in accordance with this disclosure, shown having a combustor section support structure in accordance with this disclosure.

Reference will now be made to the drawings wherein like reference numerals identify similar structural features or aspects of the subject disclosure. For purposes of explanation and illustration, and not limitation, an illustrative view of an embodiment of a combustor section support structure in accordance with the disclosure is shown in FIG. 1 and is designated generally by reference character 99. Other embodiments and/or aspects of this disclosure are shown in FIGS. 2-11. Certain embodiments described herein can be used to provide support that allows radial movement due to thermal mismatch while preventing axial movement of a fuel manifold without causing axial stress.

In accordance with at least one aspect of this disclosure, referring to FIGS. 1-6, a combustor section support structure 100 can include a fuel manifold 101 and one or more radial stud assemblies 103 (e.g., as referenced in FIG. 3) connected to the fuel manifold 101 (e.g., as referenced in FIG. 3) and configured to allow the fuel manifold 101 to move radially relative to an engine case 105 (e.g., due to thermal growth mismatch) and to fix the fuel manifold 101 axially relative to the engine case 105. Each of the one or more radial stud assemblies 103 can include a first portion 103a mounted to the fuel manifold 101 and a second portion 103b configured to mount to the engine case 105. The first portion 103a and the second portion 103b can be configured to slide relative to each other to allow relative radial movement, but to prevent axial relative movement.

The first portion 103a can extend from the fuel manifold 101 to a radial distance that is less than an inner diameter 105a of the engine case 105. In certain embodiments, the structure 100 can include the engine case 105.

Figure 2:
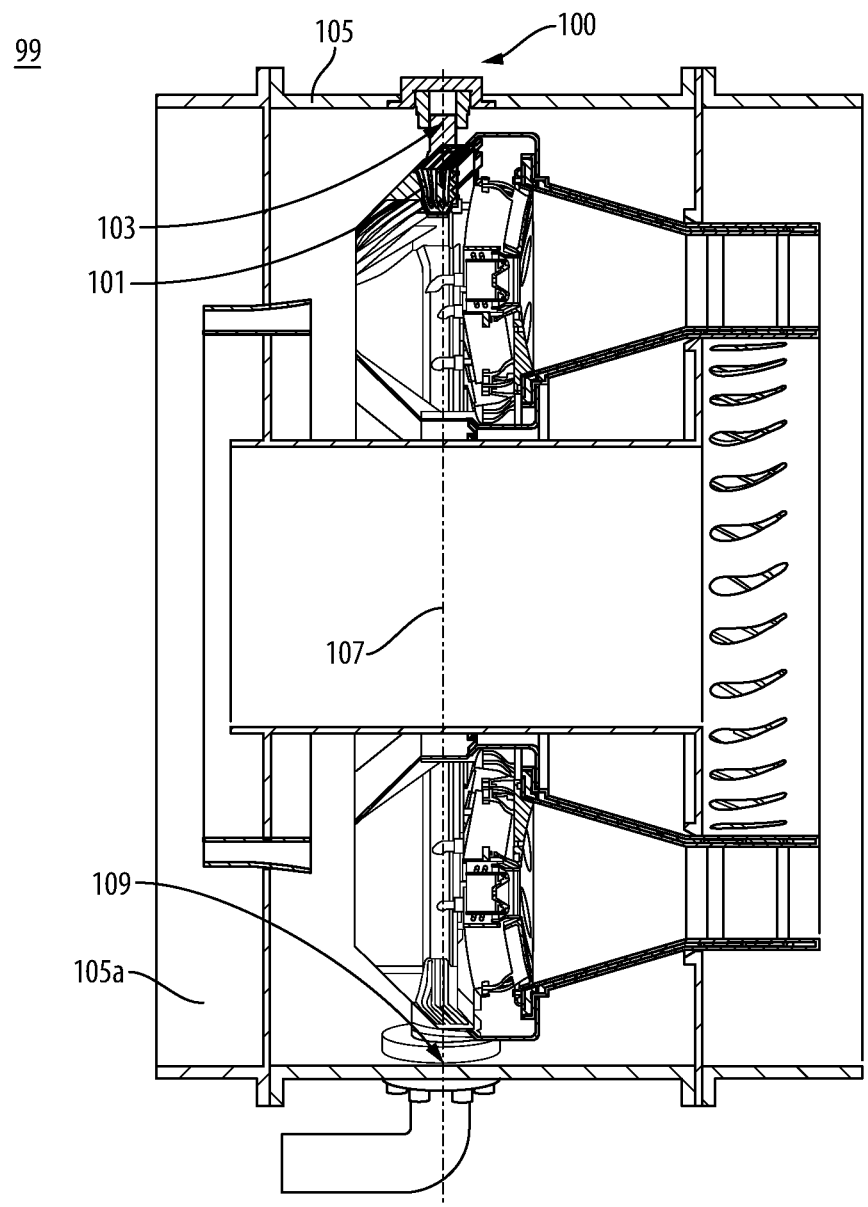
FIG. 2 is a cross-sectional view of the embodiment of FIG. 1, showing an alignment line/fixed axial plane in accordance with this disclosure.
Figure 3:
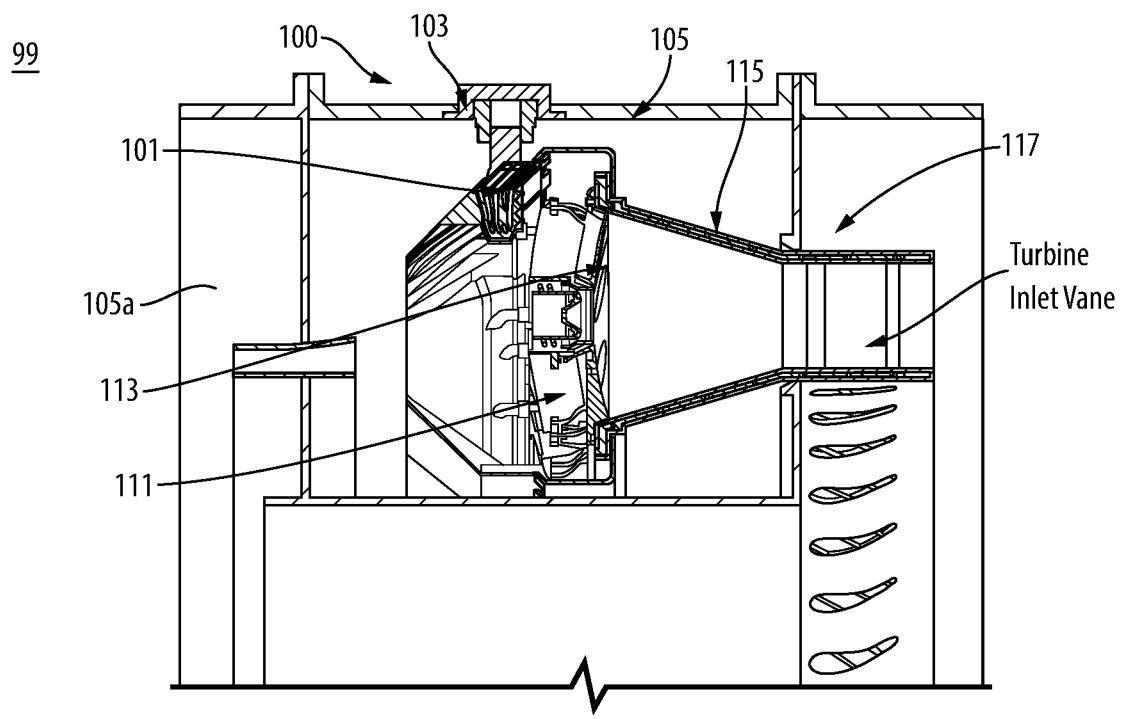
FIG. 3 is a partial, cross-sectional view of the embodiment of FIG. 1.

The one or more radial stud assemblies 103 can be radially aligned (e.g., alone an axial plane 107 as shown in FIG. 2) with a fuel inlet tube 109 (e.g., with a structural and/or thermal expansion centerline) associated with the engine case 105. In certain embodiments, the structure 100 can include a plurality of fuel nozzles 111 connected to and supported by the fuel manifold 101, a dome plate 113 connected to the plurality of the fuel nozzles 111, a combustor liner 115 connected to the dome plate 113, and a sliding seal 117 configured to extend from the engine case 105 (e.g., mounted to the engine case 105) and radially supporting a downstream portion of the combustor liner 115. The sliding seal 117 is configured to allow the combustor liner 115 to move axially (e.g., due to thermal growth when hot) and maintain a sealed relationship with the combustor liner 115. The structure 100 can include any other suitable turbomachine combustor and related components.

Figure 4:
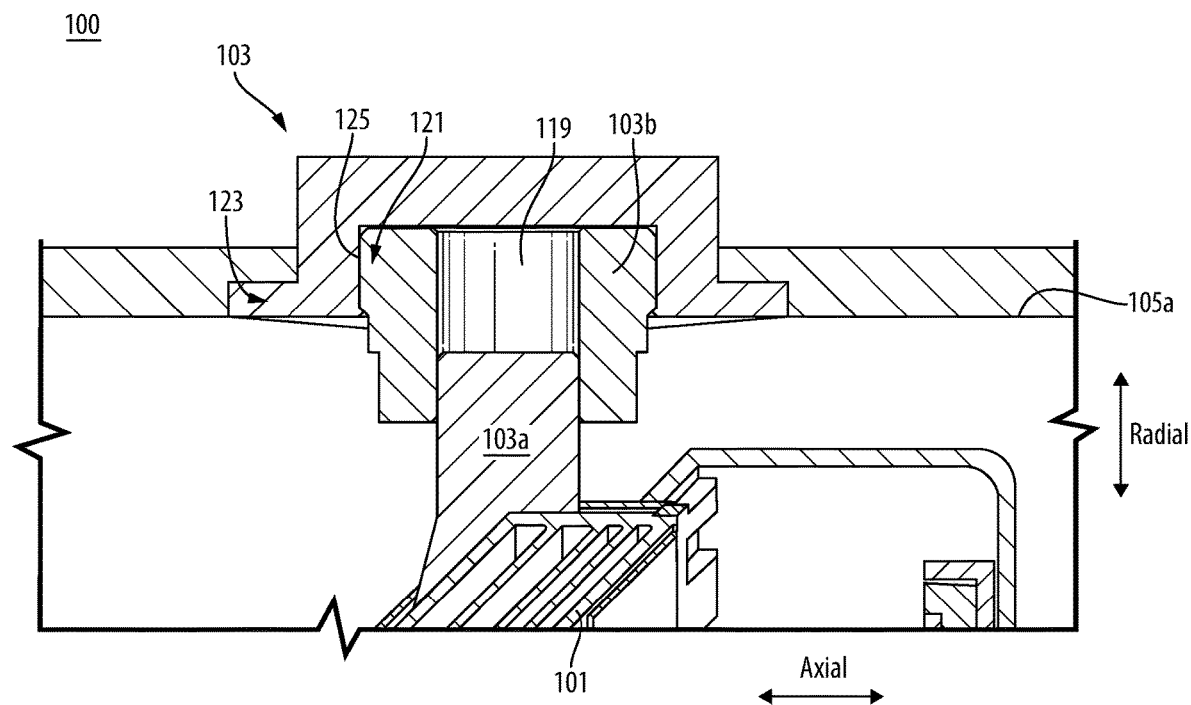
FIG. 4 is a close up view of the embodiment of a support structure of FIG. 1.
Figure 5:
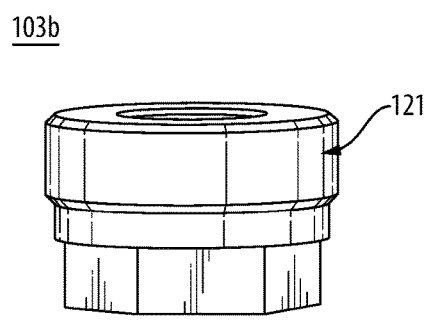
FIG. 5 is a perspective view of an embodiment of a nut in accordance with this disclosure.
Figure 6:
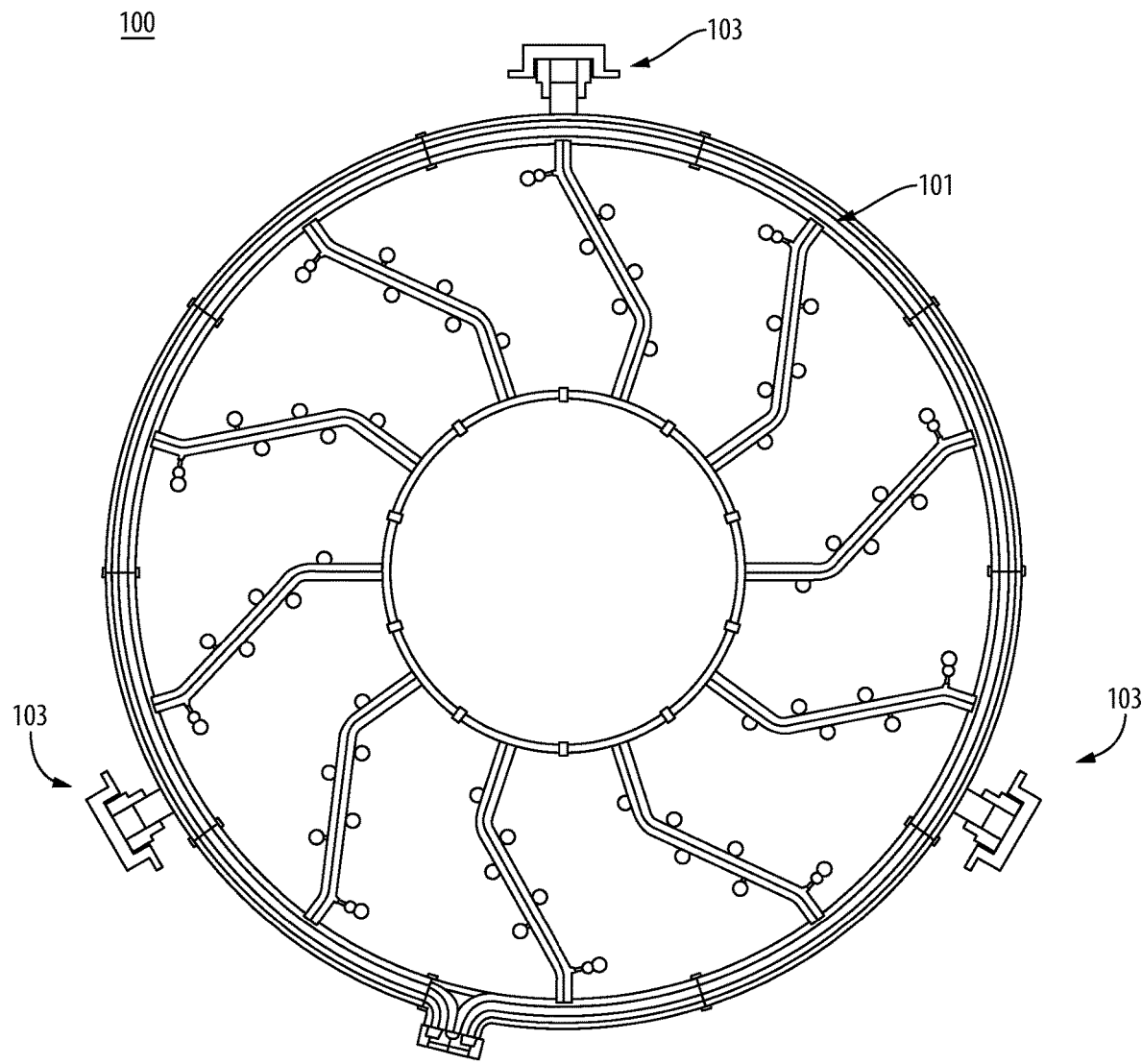
FIG. 6 is a schematic diagram showing an arrangement of a plurality of support structures on an embodiment of a fuel manifold.

In certain embodiments, e.g., as shown in FIG. 4, the first portion 103a can be a stud (e.g., as shown in FIGS. 1-7B). The second portion 103b can be a nut (e.g., as shown in FIGS. 4 and 5) having a stud channel 119 configured to slidably receive the stud, and outer nut threads 121 configured to thread to a nut socket 123. The assembly structure 100 can include a plurality of assemblies 103 (e.g., three evenly spaced circumferentially as shown in FIG. 6). Any suitable number and arrangement of assemblies to mount the manifold 101 as disclosed herein to allow relative radial, but not axial, thermal expansion is contemplated herein.

The one or more radial stud assemblies 103 can further include the nut socket 123 having inner socket threads 125 configured to mesh with the outer nut threads 121. In certain embodiments, the nut socket 123 can be attached to the engine case 105 (e.g., welded or otherwise fixed).

Figure 7A:
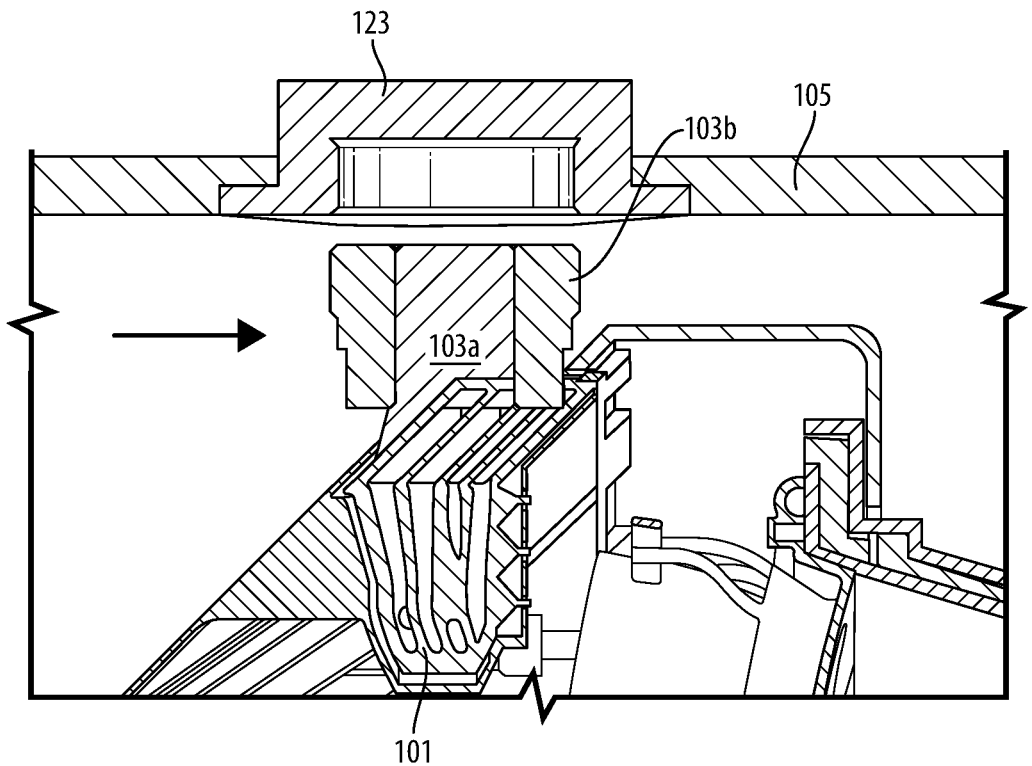
FIG. 7A shows a portion of an embodiment of a method in accordance with this disclosure.
Figure 7B:
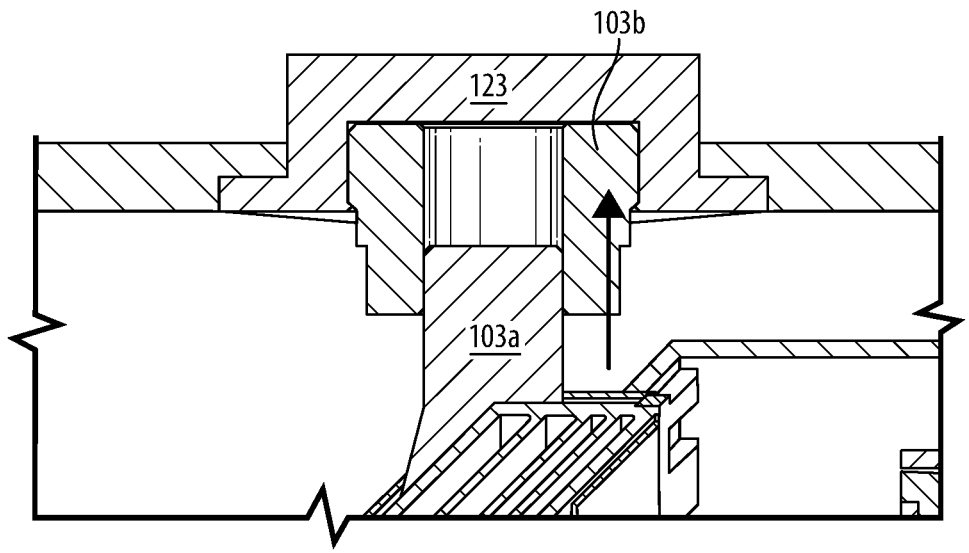
FIG. 7B shows another portion of the embodiment of a method of FIG. 7A.

As shown in FIGS. 7A and 7B, in accordance with at least one aspect of this disclosure, a method can include inserting a fuel manifold 101 axially into an engine case 105 to a mount location such that a radial stud assembly 103 attached to the fuel manifold 101 is aligned with a fuel inlet 109. The method can include moving a nut (e.g., first portion 103b) of the radial stud assembly 103 radially outward relative to a stud (e.g., first portion 103a) of the radial stud assembly 103 and the fuel manifold 101. The method can include attaching the nut to the engine case 105 (e.g., threading the second portion 103b to socket 123) such that the nut is configured to allow the stud to move radially relative to the engine case 105 and to constrain the stud axially relative to the engine case 105. In certain embodiments, attaching the nut can include threading the nut into a socket 123 associated with the engine case 105 while the stud is within a stud channel 119 of the nut.

Figure 8:
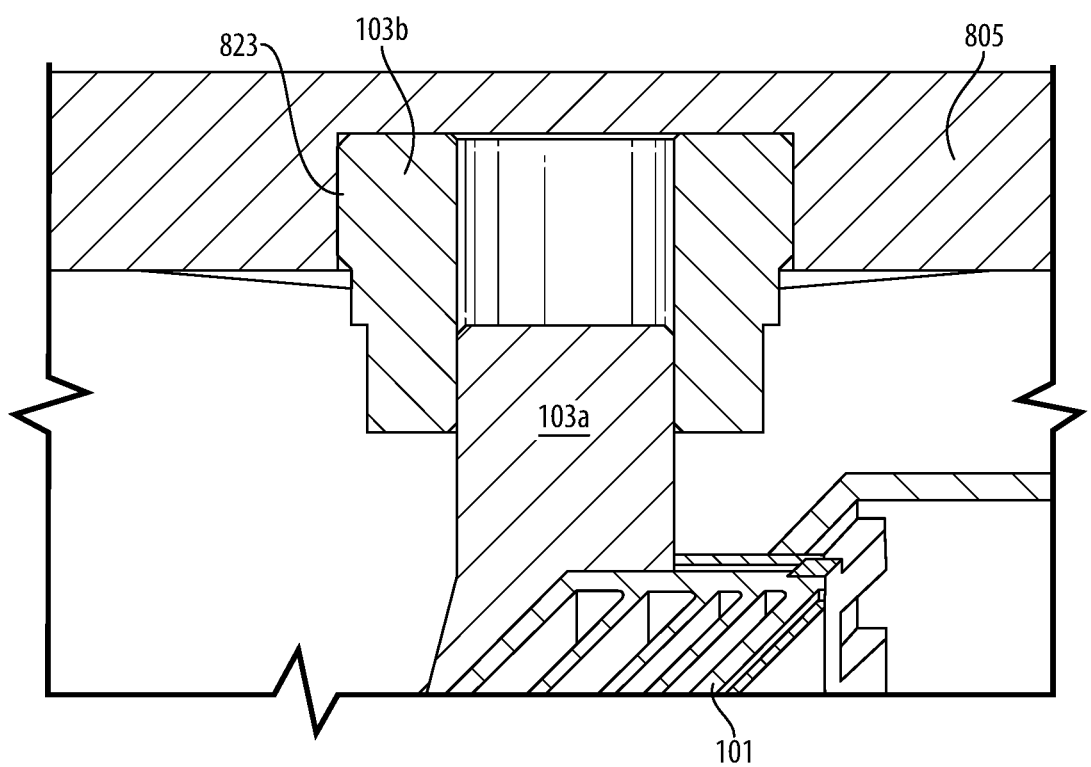
FIG. 8 shows an embodiment of a support structure in accordance with this disclosure.
Figure 9:
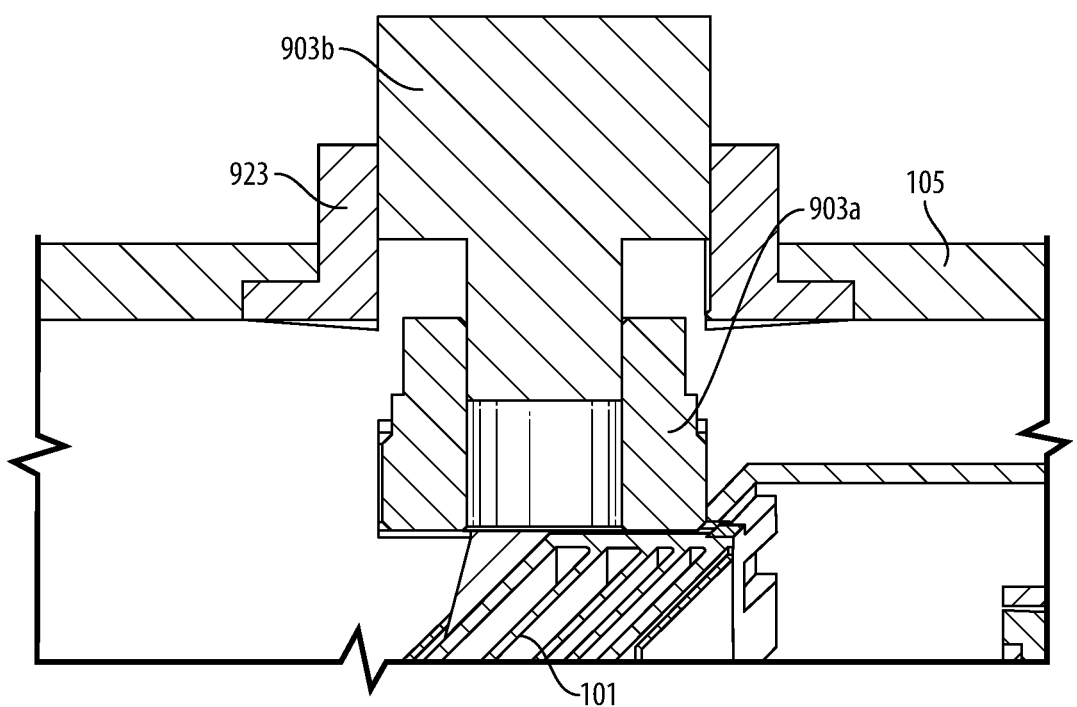
FIG. 9 shows an embodiment of a support structure in accordance with this disclosure.

In certain embodiments, referring to FIG. 8, the nut socket 823 can be formed in the engine case 805 (e.g., as shown in FIG. 8). For example, the socket 823 can be a threaded aperture define in an engine case 805 that is suitably thick to provide necessary strength. In certain embodiments, e.g., as shown in FIG. 9, the first portion 903a can be a nut attached to the fuel manifold 101. The second portion 903b can be a stud configured to be installed through the engine case 105 (e.g., through socket 923). For example, the second portion 903b can thread to the socket 923, or can otherwise be inserted into and fixed to the socket 923. The nut (e.g., the first portion 903a as shown in FIG. 9) can include a stud channel (e.g., as disclosed above) configured to slidably receive the stud, for example.

In accordance with at least one embodiment of this disclosure, e.g., as shown in FIGS. 1-9, a turbomachine 99 can include a combustor section support structure, e.g., structure 100. The structure can be any suitable embodiment of a structure disclosed herein, for example, e.g., structure 100 as described above.

Figure 10:
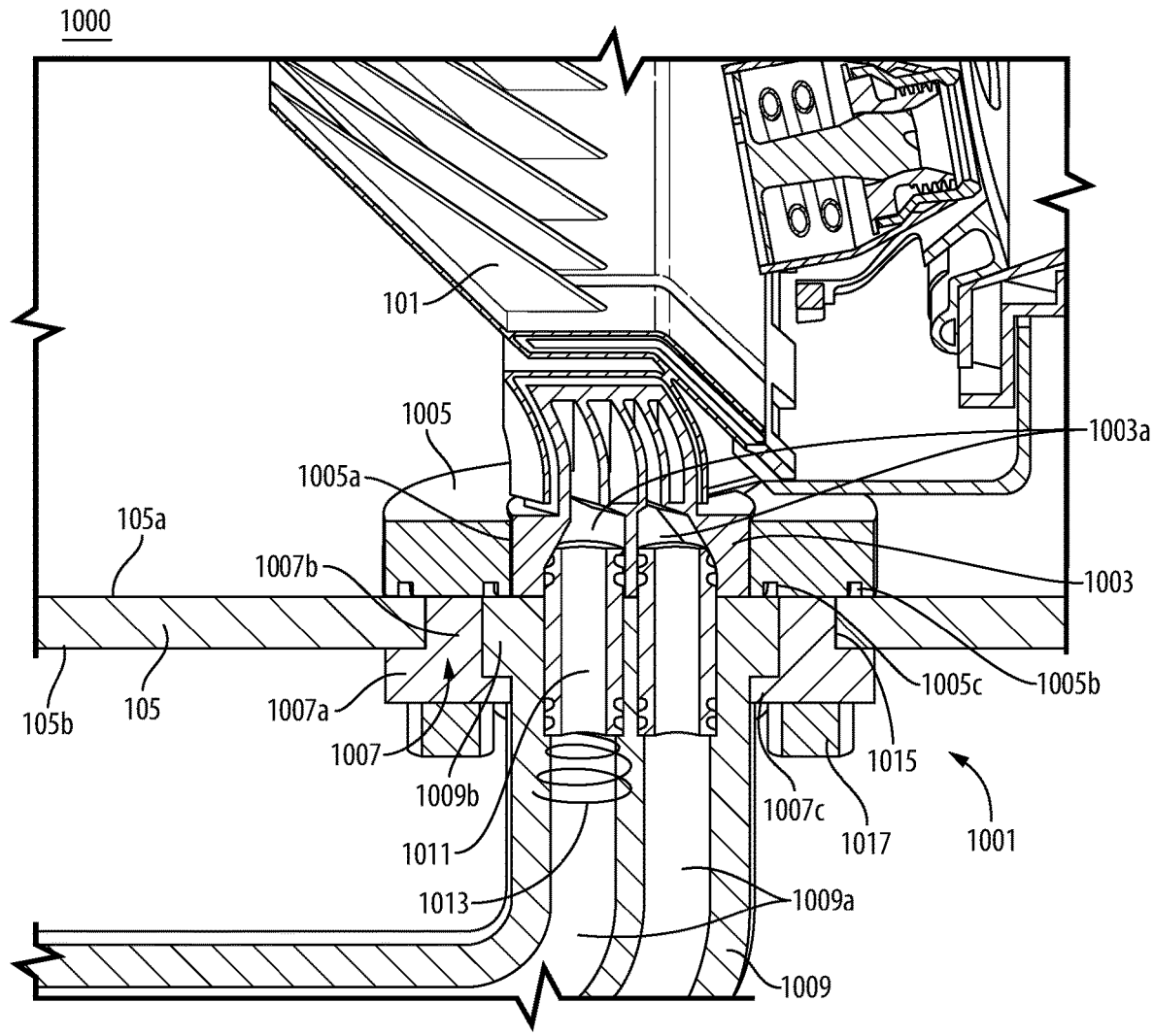
FIG. 10 is a cross-sectional view of an embodiment of a system in accordance with this disclosure.
Figure 11:
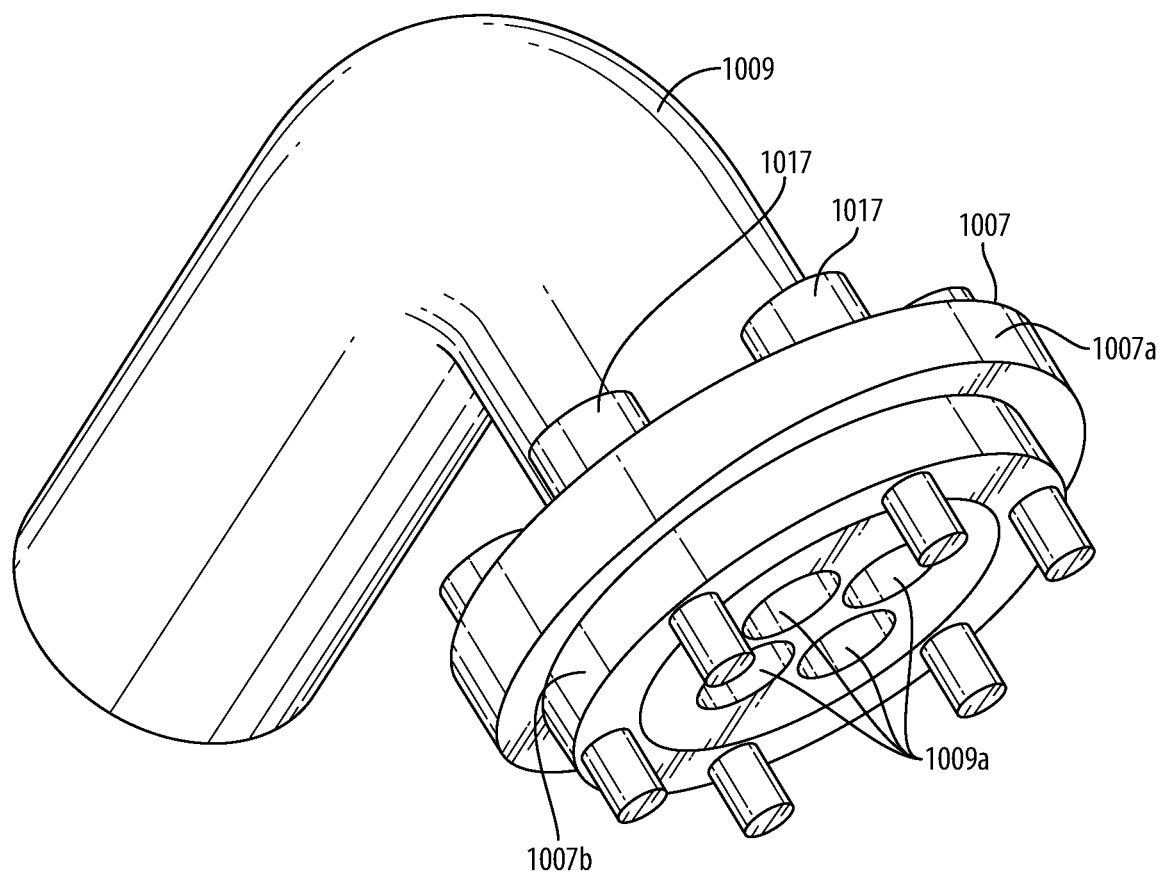
FIG. 11 is a perspective view of an embodiment of a fuel inlet tube and an embodiment of an outer mount of the embodiment of FIG. 10 in accordance with this disclosure.

In accordance with at least one aspect of this disclosure, referring additionally to FIGS. 10 and 11, a system 1000 can include a fuel manifold 101 configured to distribute fuel to one or more fuel nozzles 111 of a turbomachine 99, and a fuel inlet assembly 1001 configured to connect to the fuel manifold 101 through an engine case 105. The fuel inlet assembly 1001 can be configured to axially retain the fuel manifold 101 relative to the engine case 105 and to allow radial movement of the fuel manifold 101 relative to the engine case (e.g., due to thermal expansion mismatch). The assembly 1001 can work in concert with the structure 103 as disclosed above, and can be aligned along the axial plane 107 as described above, for example.

In certain embodiments, the fuel inlet assembly 1001 can include a fuel inlet socket 1003 fixed to the fuel manifold 101. The fuel inlet socket 1003 can define one or more (e.g., four) socket fuel channels 1003a in fluid communication with one or more flow paths (not shown) of the fuel manifold 101.

The fuel inlet assembly 1001 can include an inner mount 1005 configured to abut an inner diameter 105a of the engine case 105. The inner mount 1005 can define an inner mount channel 1005a configured to receive the fuel inlet socket 1003 such that the fuel inlet socket 1003 is configured to slide radially relative to the inner mount 1005 but is retained axially by the inner mount 1005. The fuel inlet assembly 1001 can include an outer mount configured to mount 1007 to the inner mount 1005 through the engine case 105 to fix the inner mount 1005 and the outer mount 1007 to the engine case 105.

The fuel inlet assembly 1001 can include a fuel inlet tube 1009 defining one or more inlet fuel channels 1009a configured to be in fluid communication the one or more socket fuel channels 1003a of the fuel inlet socket 1003. The inner mount 1005 and the outer mount 1007 are configured to radially retain the fuel inlet tube 1009 therebetween.

The fuel inlet assembly 1001 can include one or more transfer tubes 1011 between the one or more inlet fuel channels 1009a and the one or more socket fuel channels 1003a. The one or more transfer tubes 1011 can be configured to move relative to the fuel inlet tube 1009 and maintain engagement with the fuel inlet socket 1003 to follow radial motion of the fuel inlet socket 1003 (e.g., due to relative thermal contraction of the fuel manifold 101 relative to the engine case 105). The one or more transfer tubes 1011 can be biased toward the fuel inlet socket 1003 with one or more biasing members 1013. In certain embodiments, each of the one or more transfer tubes 1011 can be partially disposed within and sealed to a respective inlet fuel channel 1009a and a socket fuel channel 1003a (e.g., via one or more oring seals disposed in one or more seal channels as shown). In certain embodiments, each of the one or more biasing members 1013 can be disposed within a respective inlet fuel channel 1009a (e.g., to push the transfer tubes 1011 against the interior walls of the fuel inlet socket 1003).

The inner mount 1005 can include an engine case seal channel 1005b that is configured to receive a first seal (not shown) to seal to the inner diameter 105a of the engine case 105. The inner mount 1005 can include a fuel inlet tube seal channel 1005c configured to receive a second seal (not shown) to seal to the fuel inlet tube 1009 e.g., an end face of the fuel inlet tube 1009 as shown).

In certain embodiments, the outer mount 1007 can include an outer flange portion 1007a and a post portion 1007b. The post portion 1007b can be configured to insert into an opening 1015 in the engine case 105. The outer flange portion 1007a can be configured to limit insertion of the post portion 1007b (e.g., by contacting an outer surface 105b of the case 105). The post portion 1007b can be the same length as the engine case 105 is thick to abut the inner mount 1005 (e.g., as shown in FIG. 10). The outer mount 1007 can include an inner flange portion 1007c that is configured to radially trap the fuel inlet tube 1009 by engaging with a fuel inlet tube flange 1009b. The outer mount 1007 can include a plurality of fastener holes (not shown) each configured to allow a fastener 1017 to extend through the outer mount 1007 to interface with the inner mount 1005.

For example, the inner mount 1005 can include a plurality of engagement holes (not shown) configured to receive the fastener 1017 extending through the outer mount 1005. Each fastener 1017 can be a threaded bolt, and the engagement holes can be threaded to mesh with each threaded bolt.

In certain embodiments, the inner mount 1005 can be shaped to be conformal to the inner diameter 105a of the engine case 105 (e.g., to have a matching curvature). The outer mount 1007 can be shaped to be conformal to an outer surface 105b of the engine case 105.

In accordance with at least one aspect of this disclosure, a turbomachine 99 can include an engine case (e.g., as disclosed above), a fuel manifold (e.g., as disclosed above), a fuel inlet socket (e.g., as disclosed above) fixed to the fuel manifold, an inner mount (e.g., as disclosed above) abutting an inner diameter of an engine case, an outer mount (e.g., as disclosed above) mounted to the inner mount through the engine case to fix the inner mount and the outer mount to the engine case, and a fuel inlet tube (e.g., as disclosed above). The inner mount and the outer mount can radially retain the fuel inlet tube therebetween, e.g., as disclosed above.

In accordance with at least one aspect of this disclosure, a method can include axially loading a fuel manifold into an engine case of a turbomachine with an inner mount and a fuel inlet socket disposed within an inner mount channel of the inner mount, and inserting an outer mount and a fuel inlet tube having one or more biased transfer tubes into an opening of the engine case to abut the inner mount to the outer mount and to fluidly connect the one or more biased transfer tubes to the fuel inlet socket. The method can include attaching the outer mount to the inner mount to fix the outer mount and the inner mount to the engine case to axially fix the fuel manifold, the inner mount, the outer mount, the fuel inlet tube, and the fuel inlet socket such that the fuel inlet socket is configured to radially move relative to the inner mount and the biased transfer tubes are configured to push against the fuel inlet socket to maintain a sealed fluid communication with the fuel inlet socket.

Embodiments can provide support of a combustor section, for example. Traditional systems require burner seals, for example. Traditional systems connect the combustor liner directly to casing, for example, and other components must be sealed in a complex manner due to axial growth. Additionally, traditional systems have a combustor load that is carried through the dome, which requires the dome to be thicker to handle forces while hot.

In certain embodiments, the fuel injectors disclosed herein can be mounted to an internal fuel manifold (e.g., via a flexible/coiled inlet hose flow structure) rather than directly to the engine case. The combustor dome plates and combustor liner can also be attached to the internal fuel manifold. To accommodate the axial thermal expansion, the combustor liner can have a sliding interface near the exit of the combustor. The fuel manifold can be fixed axially through studs located circumferentially around the combustor. These studs can lock the combustor section to the engine case at a specific axial location that is coincident with the centerline of the incoming fuel inlet line. By placing the axial location of the studs in-line with the fuel inlet, there is no stress on the manifold inlet line caused by the axial thermal mismatches between the combustor liner and engine case, for example. In embodiments, the studs allow radial movement. The studs can have a sliding fit in which the movement axis is perpendicular to the engine centerline axis, for example. This can accommodate any relative radial growth that may happen between a cold fuel manifold and a hot engine case, for example.

In certain embodiments, there can be at least two studs which hold up the engine and are located circumferentially around the combustor section. These two or more studs each can have an axis that intersects the centerline of the engine, but are at an angle relative to each other. This can allow them to keep the fuel manifold concentric within the engine case, for example.

The axial plane of the studs can be the same as the axial plane of the fuel inlet. This reduces the stresses caused by thermal mismatch. The studs can be directly attached to the fuel manifold. The fuel manifold can be the main structure that supports the nozzles, dome, and combustor liner, for example. Since the manifold can remain cool, it is more capable of supporting this structure than a typical combustor section which attaches the outer combustor liner to case, and uses a hot dome to carry the load of the liner, for example.

Combustors are supported by the engine case. Fuel injectors are also typically mounted to the engine case. Thermal displacement causes stresses in fuel components. This can cause them to break, or be overdesigned. Also, the load is traditionally carried through hot combustor components, which does not have high strength at high temperatures. Certain embodiments include a method of connecting an internal fuel manifold to the engine case. Embodiments can include a manifold that provides a cold structure to carry the load of the combustor liner. Certain embodiments result in lighter weight components (e.g., more strength at colder temperatures), less stress in fuel components, and a way of assembling an internal manifold into a combustor section.

Certain embodiments can include an internal fuel manifold and a multipoint fuel array and embodiments for providing fuel to the fuel manifold. The fuel can be passed through a high pressure case and can be able to seal both the air and fuel. In addition, it can accommodate a thermal displacement and supply multiple separate fuel channels to allow fuel staging.

Embodiments can include a fuel inlet which connects external fuel lines to an internal fuel manifold. The inlet can be responsible for thermal compliance (e.g., radially), support multiple separate fuel channels, and can allow installation inside of the engine case. The axial plane of the combustor supports can be the same as the axial plane of the fuel inlet. This can reduce the stresses caused by thermal mismatch. In embodiments, the inlet only has to accommodate radial thermal growth. In embodiments, the inlet can be constrained to prevent axial expansion, and embodiments can provide a structure to properly seal the fuel inlet and account for radial expansion at the fuel inlet. The fuel inlet tube can has four fuel channels for example, but can contain fewer or more. Multi-channel fuel inlets can allow flowing fuel to different circuits to control fuel flow in different states (e.g., start up, low flow idle, etc.).

Embodiments can allow internal manifold installation and connection to an external fuel source. Embodiments can allow thermal expansion of the fuel components, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
    a fuel manifold configured to distribute fuel to one or more fuel nozzles of a turbomachine; and
    a fuel inlet assembly configured to connect to the fuel manifold through an engine case, wherein the fuel inlet assembly is configured to axially retain the fuel manifold relative to the engine case and to allow radial movement of the fuel manifold relative to the engine case, the fuel inlet assembly comprising:
        a fuel inlet socket fixed to the fuel manifold, the fuel inlet socket defining one or more socket fuel channels in fluid communication with one or more flow paths of the fuel manifold;
        an inner mount configured to abut an inner diameter of the engine case, the inner mount defining an inner mount channel configured to receive the fuel inlet socket such that the fuel inlet socket is configured to slide radially relative to the inner mount but is retained axially by the inner mount;
        an outer mount configured to mount to the inner mount through the engine case to fix the inner mount and the outer mount to the engine case, the outer mount comprising an outer flange portion and a post portion, wherein the post portion is configured to insert into an opening in the engine case, and wherein the outer flange portion is configured to limit insertion of the post portion; and
        a fuel inlet tube defining one or more inlet fuel channels configured to be in fluid communication with the one or more socket fuel channels of the fuel inlet socket, wherein the inner mount and the outer mount are configured to radially retain the fuel inlet tube therebetween.

2. The system of claim 1, wherein the fuel inlet assembly further comprises one or more transfer tubes between the one or more inlet fuel channels and the one or more socket fuel channels.

3. The system of claim 2, wherein the one or more transfer tubes are configured to move relative to the fuel inlet tube and maintain engagement with the fuel inlet socket to follow radial motion of the fuel inlet socket.

4. The system of claim 3, wherein each of the one or more transfer tubes is partially disposed within and sealed to a respective inlet fuel channel and a socket fuel channel.

5. The system of claim 4, wherein one or more springs are disposed within a respective inlet fuel channel.

6. The system of claim 5, wherein the inner mount includes an engine case seal channel configured to receive a first seal to seal to the inner diameter of the engine case, and a fuel inlet tube seal channel configured to receive a second seal to seal to the fuel inlet tube.

7. The system of claim 1, wherein the post portion is the same length as the engine case is thick to abut the inner mount.

8. The system of claim 7, wherein the outer mount includes an inner flange portion that is configured to radially trap the fuel inlet tube by engaging with a fuel inlet tube flange.

9. The system of claim 8, wherein the outer mount includes a plurality of fastener holes each configured to allow a respective one of a plurality of fasteners to extend through the outer mount to interface with the inner mount.

10. The system of claim 9, wherein the inner mount includes a plurality of engagement holes each configured to receive the respective one of the plurality of fasteners extending through the outer mount.

11. The system of claim 10, wherein each of the plurality of fasteners is a threaded bolt and wherein each of the plurality of engagement holes is threaded to mesh with the respective one of the plurality of fasteners.

12. The system of claim 11, wherein the inner mount is shaped to be conformal to the inner diameter of the engine case.

13. The system of claim 12, wherein the outer mount is shaped to be conformal to an outer surface of the engine case.

\* \* \* \* \*